R. W. LESLEY.
APPARATUS FOR THE MANUFACTURE OF PORTLAND CEMENT.
APPLICATION FILED SEPT. 3, 1918.

1,323,293. Patented Dec. 2, 1919.

WITNESS

INVENTOR
Robert W. Lesley
BY
Redding, Greeley & Goodlett
ATTORNEYS

UNITED STATES PATENT OFFICE.

ROBERT W. LESLEY, OF HAVERFORD, PENNSYLVANIA.

APPARATUS FOR THE MANUFACTURE OF PORTLAND CEMENT.

1,323,293.  Specification of Letters Patent.  Patented Dec. 2, 1919.

Application filed September 3, 1918. Serial No. 252,312.

*To all whom it may concern:*

Be it known that I, ROBERT W. LESLEY, a citizen of the United States, residing in the city of Haverford, in the State of Pennsylvania, have invented certain new and useful Improvements in Apparatus for the Manufacture of Portland Cement, of which the following is a specification, reference being had to the accompanying drawing, forming a part hereof.

The general purpose of this invention is to effect an economy in the manufacture of Portland cement through the utilization of the waste heat of kilns, such as those commonly employed in the calcining of cement raw materials, and of oil shale, a material found in great quantities and consisting of argillaceous material saturated with hydrocarbon or containing a substantial percentage of carbon and organic matters. In accordance with this invention the oil shale is subjected to a process of distillation, preferably by the utilization of the waste heat from a kiln, the permanent gas thus produced is returned to a kiln for use as fuel, the other products of distillation being recovered as may be desired, and the residuum or spent shale, being argillaceous, is mixed with calcareous material and calcined to form cement clinker in the usual manner.

The invention will be more fully explained hereinafter with reference to the accompanying drawing in which it is illustrated and in which—

Figure 1:
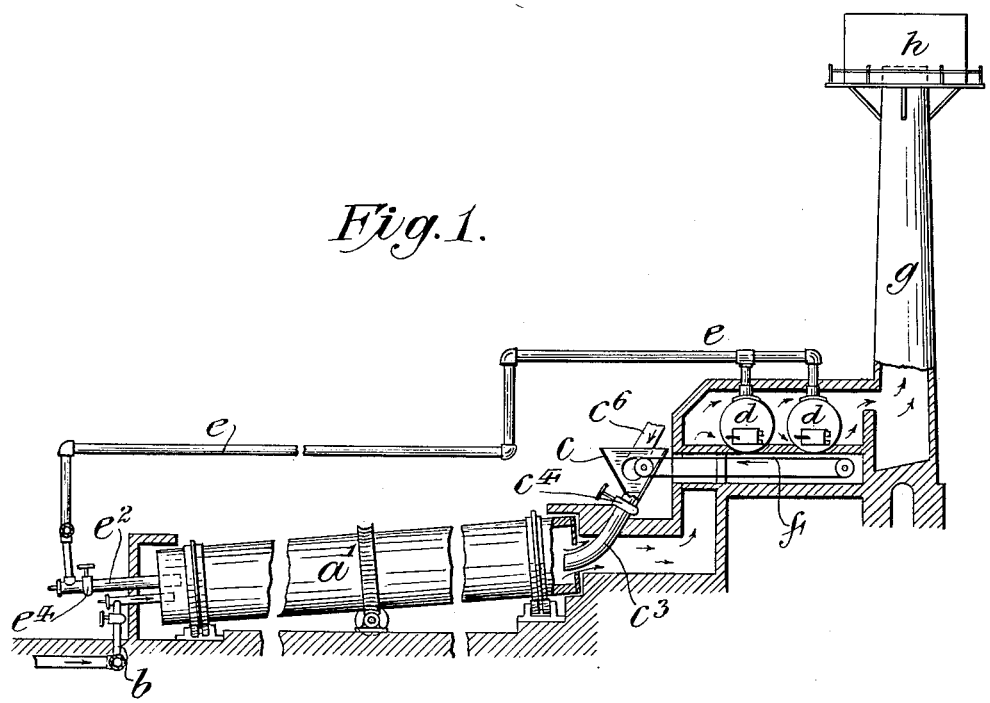
Figure 1 is a conventional view in elevation of an apparatus in which the invention may be embodied.
Figure 2:
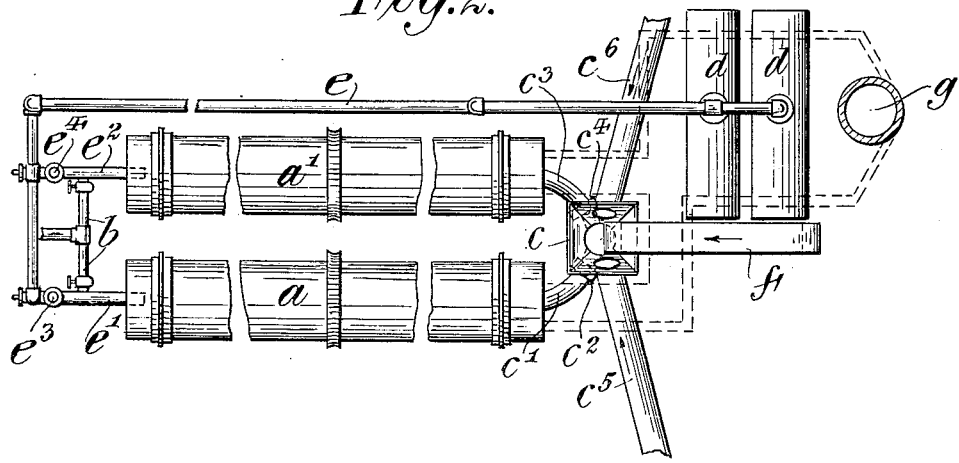
Fig. 2 is a similar view in plan.

The apparatus represented in the drawing is shown as having two rotary kilns $a$ and $a^1$, such as are commonly employed in the calcining of cement raw materials to form cement clinker, to the lower or discharge end of which any suitable fuel may be supplied, a gas or oil supply pipe being indicated at $b$. The material to be treated in the kilns is fed in as usual at the upper end, a single feed hopper being indicated at $c$, with a suitable pipe $c^1$ to conduct the material from the hopper to the kiln $a$ and provided with a gate as at $c^2$, and with a suitable pipe $c^3$ to conduct the material from the hopper to the kiln $a^1$, similarly provided with a gate $c^4$. At $c^5$ is indicated a means for supplying one material, such as argillaceous material, to the hopper $c$ and at $c^6$ is indicated a means for supplying another material, such as calcareous material, to the hopper $c$.

From the upper end of each kiln the hot gases pass eventually to a stack $g$, which may be equipped with the usual apparatus, indicated at $h$, for the extraction of potash, ammonia, etc., from the spent gases. Before the hot gases from the kilns reach the stack, however, they are made to give up their heat in large measure to retorts $d$ which are charged with raw oil shale. The waste gases from rotary kilns as now commonly used in the manufacture of Portland cement pass off with a temperature of from 1000° F. to 1400° F., while the heat required for the distillation of oil shales varies from about 800°F. for the lighter oils to about 1300° F. for the heavier oils. The heat furnished by the waste gases from the kilns is therefore sufficient to carry on the distillation of the oil shales. In such distillation there is produced not only the oil but a permanent, combustible gas of great fuel value. The gases which pass off from the kilns have great heat value, as stated, but they are non-combustible and therefore are not available as fuel without further treatment.

The residuum or spent shale which remains after the process of distillation of the oil shale, is argillaceous and is immediately available for use as one of the components of Portland cement and is immediately available for mixture with the calcareous material for calcination in a kiln.

The permanent gas which is produced in the distillation of the oil shale, having a high fuel value, is conducted from the retorts $d$ through a suitable conductor $e$ and is returned to one or the other of the kilns $a$, $a^1$, the branches $e^1$, $e^2$ of the conductor $e$ being provided with suitable valves $e^3$, $e^4$.

Suitable means, such as a conveyer $f$, are provided for supplying the spent shale, which is withdrawn from the retorts $d$ after the distillation is completed, to the hopper $c$ from which it is delivered to one or the other of the kilns, after having been mixed on the way with the proper quantity of calcareous material.

If it be assumed that both of the kilns $a$, $a^1$ are supplied at the feed end with the proper mixture of argillaceous material and calcareous material and at the discharge end with a suitable fuel, and that the process of calcination is carried on in the usual manner, the hot gases which escape from the kilns effect, on their way to the stack, the distillation of the oil shale in the retorts $d$. The gas which is produced by the process of distillation is delivered continuously to the discharge ends of the kilns, replacing in large part, if not entirely, the fuel which would otherwise have to be supplied from some other source. When the process of distillation has been completed, the oil being recovered in the usual manner, the residuum or spent shale is withdrawn from the retorts and delivered to the kilns after mixture with the proper quantity of calcareous material. Obviously, the process of distillation might be carried on with a plurality of retorts in such manner that the spent shale might be withdrawn from one retort, while the process of distillation is still going on in the other retorts, so that the total operation may be practically continuous. Any suitable provisions can be made for regulating the delivery of spent shale to the kilns and for the previous mixture with the calcareous material. It might be found advantageous, in some cases, to carry on the burning of the raw oil shale in one of the kilns for the purpose of producing at the same time the heat necessary for the distillation of other raw shale in the retorts and the at least partial reduction of the shale to spent shale.

It will be understood that by the proper application of the invention the manufacture of Portland cement can be carried on with great economy, since the plant can be located directly at the point where both the fuel and the argillaceous material are found in combination, while the calcareous material can often be found in the same general locality. It will be further understood that the details of the apparatus employed as well as the details of the method practised may be varied to suit different conditions.

I do not herein claim the method of treating the oil-bearing shale above described as that forms the subject-matter of claims of a separate application for Letters Patent filed by me on April 21, 1919, Serial No. 291,704.

I claim as my invention:

1. Apparatus for use in the manufacture of Portland cement comprising a kiln, a retort for the distillation of oil shale, means to supply heat from the waste gases of the kiln to the exterior of the retort, and means to conduct the combustible gas produced in distillation from the retort to the kiln for use as fuel.

2. Apparatus for use in the manufacture of Portland cement comprising a kiln, a retort for the distillation of oil shale, means to supply heat from the waste gases of the kiln to the exterior of the retort, means to deliver the residue or shale ash from the retort to the feed end of the kiln, and means to conduct combustible gas produced in distillation from the retort to the kiln for use as fuel.

This specification signed this 28th day of August, A. D. 1918.

ROBERT W. LESLEY.